United States Patent
Ohashi et al.

(10) Patent No.: US 9,440,173 B2
(45) Date of Patent: Sep. 13, 2016

(54) AIR CLEANER

(71) Applicant: TOYOTA BOSHOKU KABUSHIKI KAISHA, Aichi-ken (JP)

(72) Inventors: Junichi Ohashi, Oobu (JP); Kunitaka Maeda, Nagoya (JP)

(73) Assignee: TOYOTA BOSHOKU KABUSHIKI KAISHA, Aichi-Ken (JP)

(*) Notice: Subject to any disclaimer, the term of this patent is extended or adjusted under 35 U.S.C. 154(b) by 40 days.

(21) Appl. No.: 14/096,453

(22) Filed: Dec. 4, 2013

(65) Prior Publication Data

US 2014/0165518 A1 Jun. 19, 2014

(30) Foreign Application Priority Data

Dec. 18, 2012 (JP) ................. 2012-275423

(51) Int. Cl.
| | | |
|---|---|---|
| *B01D 39/00* | (2006.01) | |
| *B01D 46/00* | (2006.01) | |
| *F02M 35/02* | (2006.01) | |
| *B01D 46/24* | (2006.01) | |

(52) U.S. Cl.
CPC ....... *B01D 46/0002* (2013.01); *B01D 46/0005* (2013.01); *B01D 46/2414* (2013.01); *F02M 35/0204* (2013.01); *B01D 2271/022* (2013.01); *B01D 2275/201* (2013.01)

(58) Field of Classification Search
CPC ...... B01D 28/15; B01D 29/17; B01D 35/30; B01D 2201/301; B01D 2201/307; B01D 2201/302; B01D 35/306; B01D 46/0002; B01D 46/0005
USPC ........................................................ 55/502
See application file for complete search history.

(56) References Cited

U.S. PATENT DOCUMENTS

| | | | | |
|---|---|---|---|---|
| 4,135,899 A | * | 1/1979 | Gauer ............................ | 55/482 |
| 4,418,662 A | * | 12/1983 | Engler et al. .................. | 96/133 |
| 4,498,989 A | * | 2/1985 | Miyakawa et al. ........... | 210/450 |
| 4,609,465 A | * | 9/1986 | Miller ........................ | 210/323.2 |
| 4,764,191 A | * | 8/1988 | Morelli ........................ | 55/302 |
| 5,484,529 A | * | 1/1996 | Malugade et al. ............ | 210/448 |
| 5,569,311 A | * | 10/1996 | Oda et al. ..................... | 55/493 |
| 5,605,554 A | * | 2/1997 | Kennedy ....................... | 55/493 |
| 5,679,122 A | * | 10/1997 | Moll et al. .................... | 55/497 |
| 5,916,435 A | * | 6/1999 | Spearman et al. ............ | 210/132 |
| 6,416,561 B1 | * | 7/2002 | Kallsen et al. ................ | 55/482 |
| 6,508,851 B2 | * | 1/2003 | Goerg .......................... | 55/385.3 |
| 6,572,667 B1 | * | 6/2003 | Greif et al. .................... | 55/323 |
| 6,592,655 B2 | * | 7/2003 | Iriyama et al. ................ | 96/138 |
| 6,652,615 B2 | * | 11/2003 | Quick et al. .................. | 55/502 |

(Continued)

FOREIGN PATENT DOCUMENTS

JP 2012-112311 6/2012

*Primary Examiner* — Amber R Orlando
(74) *Attorney, Agent, or Firm* — Greenblum & Bernstein, P.L.C.

(57) ABSTRACT

An air cleaner includes a housing and a tubular air cleaning element, which is accommodated in the housing. A tubular case of the housing has an end having an upstream opening and another end having a downstream opening. The upstream opening of the case is adapted to introduce air into the housing. A cap is attached to the downstream opening of the case. An annular sealing portion, which is held between the case and the cap, is provided in the outer periphery of the air cleaning element. The case includes a case body having the downstream opening and a support plate attached to the downstream opening of the case body. The sealing portion is held between the support plate and the cap.

5 Claims, 3 Drawing Sheets

(56) References Cited

U.S. PATENT DOCUMENTS

| | | | |
|---|---|---|---|
| 6,890,366 B2* | 5/2005 | Bugli et al. | 55/385.3 |
| 7,247,183 B2* | 7/2007 | Connor et al. | 55/495 |
| 7,416,584 B2* | 8/2008 | Hirata | 96/135 |
| 7,699,912 B2* | 4/2010 | Uemura et al. | 96/134 |
| 7,879,124 B2* | 2/2011 | Uemura et al. | 55/506 |
| 7,931,725 B2* | 4/2011 | Wydeven et al. | 55/498 |
| 8,048,187 B2* | 11/2011 | Merritt et al. | 55/502 |
| 8,152,887 B2* | 4/2012 | Patel | 55/485 |
| 8,409,312 B2* | 4/2013 | Gorg et al. | 55/385.3 |
| 8,518,139 B2* | 8/2013 | Jessberger et al. | 55/495 |
| 8,945,268 B2* | 2/2015 | Nelson et al. | 55/498 |
| 2002/0137835 A1* | 9/2002 | Abraham et al. | 524/487 |
| 2005/0022484 A1* | 2/2005 | Krisko et al. | 55/337 |
| 2006/0091061 A1* | 5/2006 | Brown | 210/440 |
| 2007/0175187 A1* | 8/2007 | Kopec et al. | 55/385.3 |
| 2008/0000820 A1* | 1/2008 | Mitchell | 210/141 |
| 2009/0205302 A1* | 8/2009 | Rieger | 55/498 |
| 2010/0242425 A1* | 9/2010 | Swanson et al. | 55/498 |

\* cited by examiner

AIR CLEANER

BACKGROUND OF THE INVENTION

The present invention relates to an air cleaner having a housing including a tubular case and a cap and, more particularly, to an air cleaner having an air cleaning element accommodated in the case and a sealing portion provided in the outer periphery of the air cleaning element and arranged between the case and the cap.

Some conventional air cleaners for filtering air supplied to an engine include a housing configured by a tubular case and a cap and a substantially tubular air cleaning element, which is accommodated in the housing.

One such conventional air cleaner is described in, for example, Japanese Laid-Open Patent Publication No. 2012-112311. The air cleaner has a housing configured by a first case having an air inlet port and a second case having an air outlet port. The housing receives a tubular air filter serving as an air cleaning element. The air filter is supported by the second case at a basal portion of the air filter.

SUMMARY OF THE INVENTION

Generally, to ensure desired engine performance, it is demanded that an air cleaner should have a sufficiently large clearance between the outer peripheral surface of an air cleaning element and the inner peripheral surface of a case to decrease pressure loss in the air cleaner and thus improve engine performance. Also, to accommodate the air cleaner in limited space in an engine compartment, it is demanded that the cross-sectional shapes of the housing and the air cleaning element of the air cleaner should be modified to any suitable shapes other than circular shapes.

Accordingly, it is an objective of the present invention to provide an air cleaner that increases flexibility in choice of the shape of a housing of the air cleaner without decreasing formability of a case of the housing.

To achieve the foregoing objective and in accordance with one aspect of the present invention, an air cleaner that includes a housing and a tubular air cleaning element is provided. The housing has a tubular case and a cap. The case includes an end having an upstream opening and another end having a downstream opening. The upstream opening of the case is adapted to introduce air into the housing, and the cap is attached to the downstream opening of the case. The air cleaning element is accommodated in the housing. An annular sealing portion is held between the case and the cap and is provided on an outer periphery of the air cleaning element. The case includes a case body having a downstream opening and a support plate attached to the downstream opening of the case body. The sealing portion is held between the support plate and the cap.

Other aspects and advantages of the invention will become apparent from the following description, taken in conjunction with the accompanying drawings, illustrating by way of example the principles of the invention.

DETAILED DESCRIPTION OF THE PREFERRED EMBODIMENTS

One embodiment of the present invention will now be described with reference to FIGS. 1 to 7.

Figure 1:
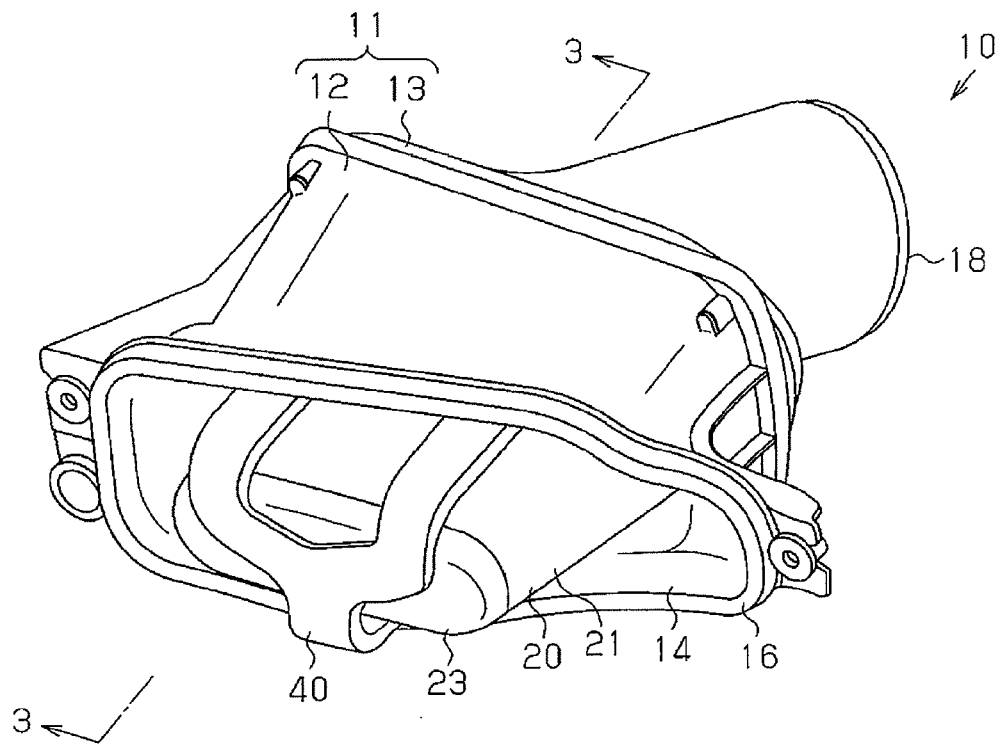
FIG. 1 is a perspective view schematically showing an air cleaner according to an embodiment of the present invention.
Figure 2:
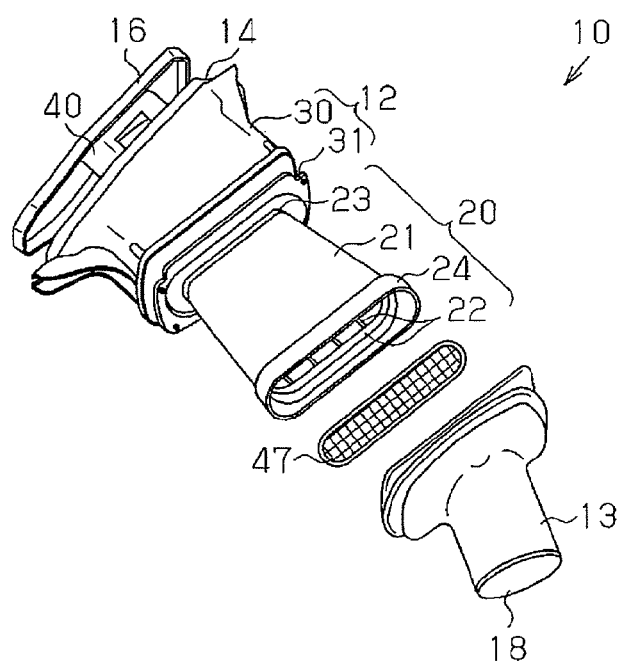
FIG. 2 is an exploded perspective view showing main components of the air cleaner in a simplified manner.

As shown in FIGS. 1 and 2, an air cleaner 10 according to the present embodiment has a housing 11, which includes a case 12 and a cap 13. The case 12 is formed of plastic and has a substantially oblong cross section. The cap 13 is formed of plastic and attached to the case 12 in a detachable manner using, for example, non-illustrated screws. An opening 14 communicating with the atmosphere is formed in an end of the case 12. A sheet rubber 16 is arranged around the opening 14 and adhered to the case 12. The case 12 is fixed in an engine compartment with the sheet rubber 16 pressed against the wall defining a hole formed in a non-illustrated fender. An air cleaning element 20 is received in the housing 11 to filter the intake air that passes through the opening 14 of the case 12 to flow into the housing 11. After having been filtered, the intake air is supplied to the intake side of the engine through a supply port 18, which is formed in the cap 13.

Figure 3:
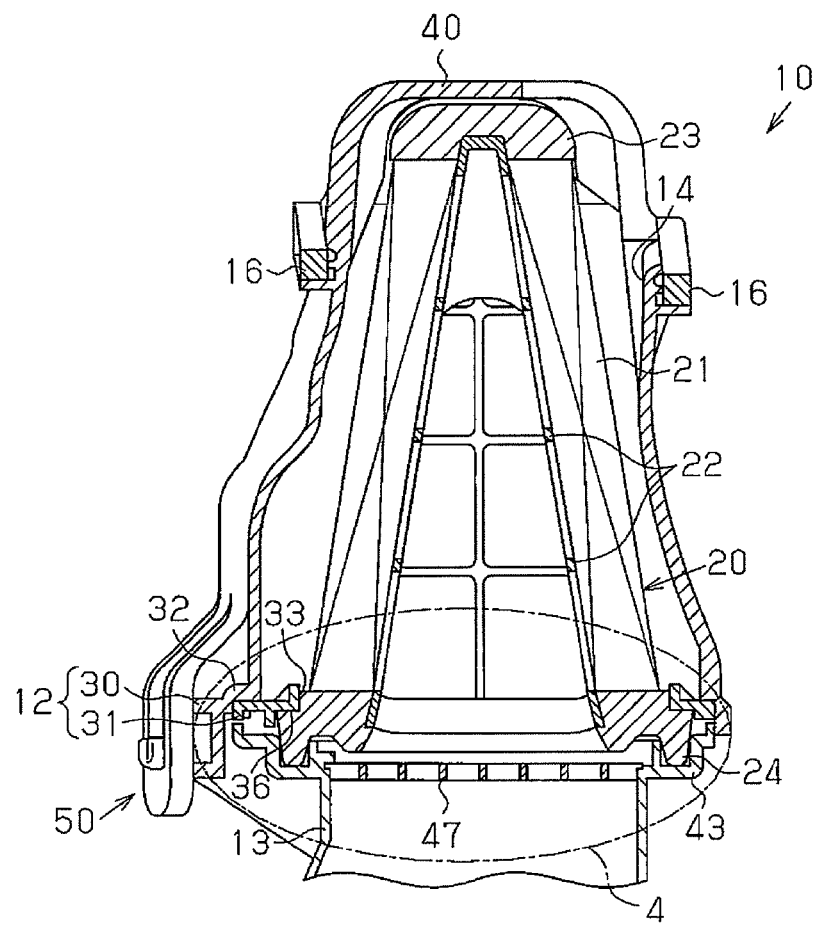
FIG. 3 is a cross-sectional view taken along line 3-3 of FIG. 1.

With reference to FIGS. 2 and 3, the air cleaning element 20 has a filter member 21, which is formed in a tubular shape as a whole using filter paper or a filter sheet. The filter member 21 and the case 12 have substantially similar shapes. More specifically, the filter member 21 has a downstream end portion located at a downstream position in the air flow direction and an upstream end portion located at an upstream position in the air flow direction. The filter member 21 has a shape tapered from the downstream end portion toward the upstream end portion. A reinforcement member 22 for maintaining the shape of the filter member 21 is arranged inside the filter member 21. The reinforcement member 22 is a lattice formed of plastic. The filter member 21 and the reinforcement member 22 are joined integrally with each other by an end plate 23 and a seal ring 24. The end plate 23 is arranged in the upstream end portion of the filter member 21. The seal ring 24 is arranged in the downstream end portion of the filter member 21. The end plate 23 and the seal ring 24 are formed of foamed polyurethane having closed cells. The air cleaning element 20 is inserted into the case 12 through the opening at the end of the case 12 opposite to the end having the opening 14.

Figure 4:
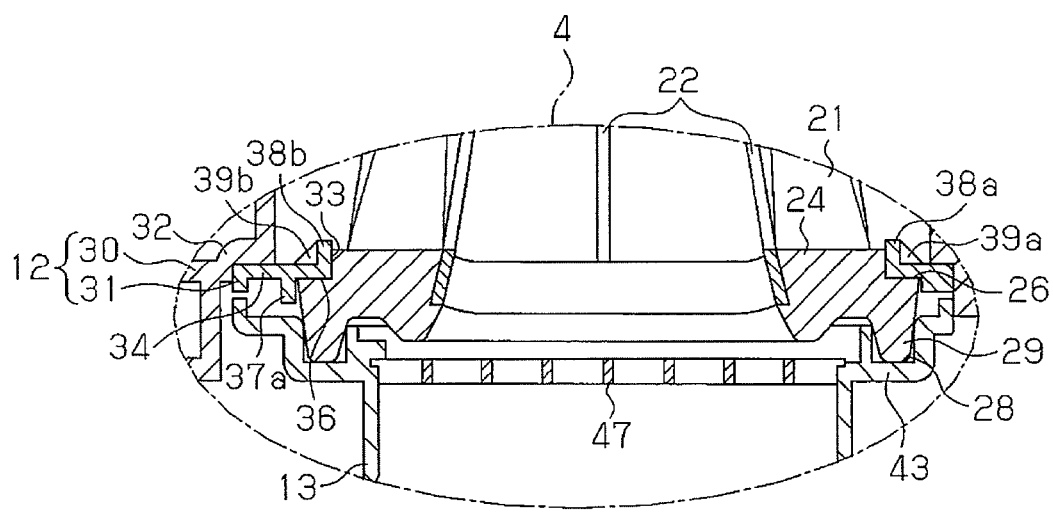
FIG. 4 is an enlarged view showing the portion encompassed by the line 4 formed by a long dash alternating with a short dash in FIG. 3.

As illustrated in FIGS. 3 and 4, the seal ring 24 has an annular stepped surface portion 26, which is formed at the outer periphery of the surface of the seal ring 24 that faces the interior of the case 12. The annular stepped surface portion 26 is located inward relative to the other portions of this surface of the seal ring 24. The opposite surface of the seal ring 24, which is the surface of the seal ring 24 facing the cap 13, has an annular projected surface portion 28, which is formed at the outer periphery of this surface of the seal ring 24 and located outward relative to the other portions of the same surface. The stepped surface portion 26 and the projected surface portion 28 configure a sealing portion 29 of the seal ring 24.

Referring to FIGS. 2 to 4, the case 12 has a tubular case body 30 and an annular support plate 31, which is attached to a downstream opening formed in the case body 30.

Figure 7:
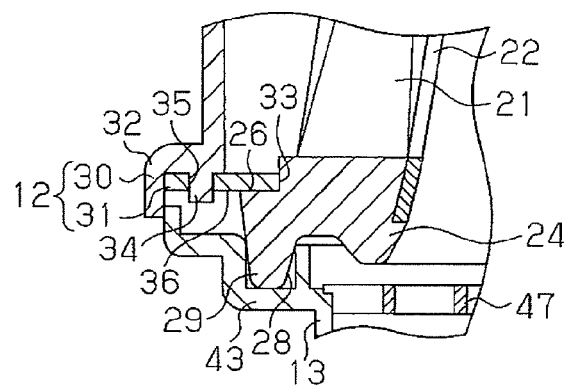
FIG. 7 is a cross-sectional view showing a portion of the air cleaner with a projection of a case body press-fitted in a hole of the support plate.

As shown in FIG. 7, a peripheral wall 32 of the case body 30 defines the downstream opening of the case body 30, or, in other words, corresponds to the portion of the case body 30 to which the support plate 31 is attached. Projections 34, which are pins, are formed in the peripheral wall 32 of the case body 30 at positions corresponding to holes 35 formed in the support plate 31. The projections 34 of the case body 30 are press-fitted in the corresponding holes 35 of the support plate 31 to attach the support plate 31 to the case body 30.

The peripheral wall 32 of the case body 30 is arranged around the seal ring 24 with a clearance between the peripheral wall 32 and the seal ring 24. The stepped surface portion 26 of the seal ring 24 contacts the support plate 31 to support the air cleaning element 20 in the housing 11 with the end plate 23 projecting from the case 12 through the opening 14.

Figure 5:
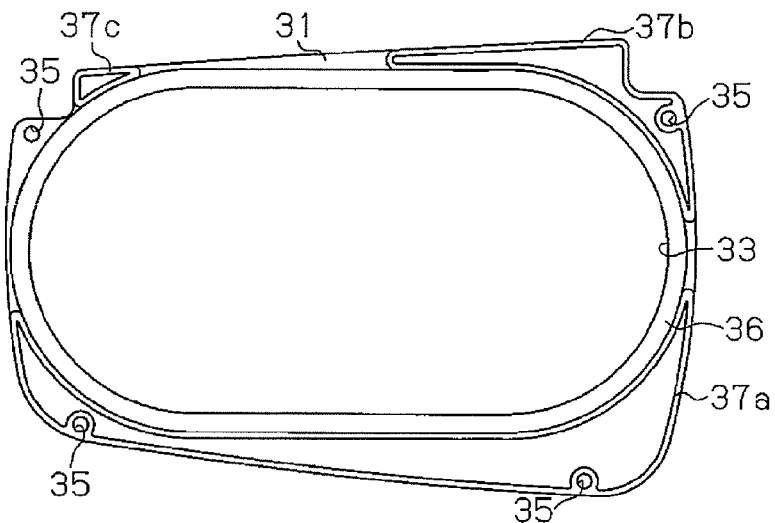
FIG. 5 is a plan view of a support plate of the air cleaner, illustrating a surface having a sealing surface.

With reference to FIG. 5, an insertion port 33 for mounting the air cleaning element 20 is formed in the middle of the support plate 31. The aforementioned holes 35 extend through an outer peripheral portion of the support plate 31.

One side of the support plate 31 has a sealing surface 36. The sealing surface 36 contacts the stepped surface portion 26 of the seal ring 24 along the entire circumference of the stepped surface portion 26, thus reliably sealing between the support plate 31 and the seal ring 24. The sealing surface 36 surrounds the insertion port 33. Reinforcement protrusions 37a, 37b, 37c, each of which has a portion extending along a corresponding portion of the outer periphery of the sealing surface 36, are formed on the surface of the support plate 31 on which the sealing surface 36 is formed.

Figure 6:
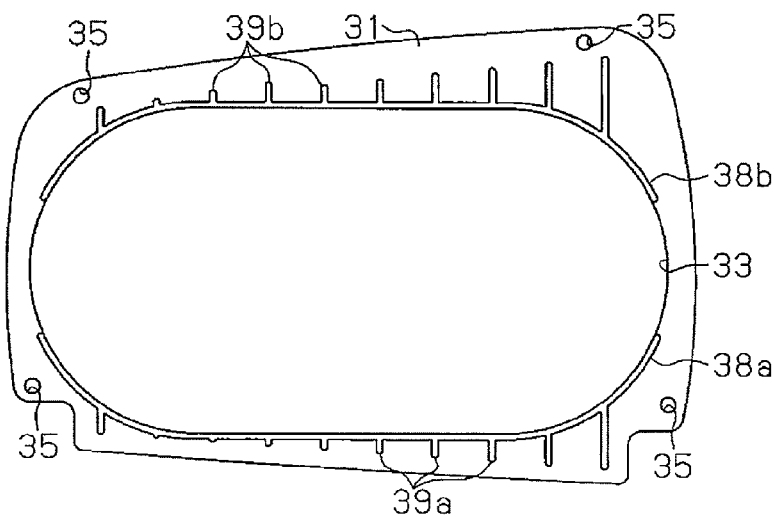
FIG. 6 is a plan view of the support plate, illustrating a surface opposite to the surface having the sealing surface.

As illustrated in FIG. 6, reinforcement protrusions 38a, 38b extending along the periphery of the insertion port 33 and reinforcement ribs 39a, 39b extending outward from the corresponding protrusions 38a, 38b are formed on the surface of the support plate 31 opposite to the surface on which the sealing surface 36 is formed.

With reference to FIGS. 1 to 4, a retainer portion 40 is formed integrally with the case body 30 to cover and hold the portion of the air cleaning element 20 projecting from the case 12 through the opening 14. The retainer portion 40 extends between the opposing walls of the case body 30 across the opening 14. The retainer portion 40 contacts the air cleaning element 20 to prevent excessive vibration of the air cleaning element 20.

As shown in FIGS. 2 to 4, a flow adjusting plate 47 is arranged upstream to the supply port 18 in the air flow direction and swaged fixedly to the cap 13. The flow adjusting plate 47 has a meshed or lattice-like shape and rectifies the intake air flowing to the exterior of the housing 11 through the supply port 18. The cap 13 has an annular holding portion 43, which contacts the sealing portion 29 of the seal ring 24. The holding portion 43 of the cap 13 holds the seal ring 24 in a sealed state between the cap 13 and the support plate 31.

As illustrated in FIG. 3, the cap 13 is attached to the case 12 using, for example, non-illustrated screws with an insert type hinge portion 50 engaged with the cap 13.

Operation of the air cleaner 10, which is configured in the above-described manner, will hereafter be described.

In the air cleaner 10, the seal ring 24 of the air cleaning element 20 is held between the support plate 31 and the cap 13 in a sealed state along the entire circumference of the seal ring 24, with the support plate 31 arranged between the case body 30 and the seal ring 24. Since the support plate 31 and the case body 30 are independent from each other, the case body 30 does not have to have a portion for holding the seal ring 24 of the air cleaning element 20 cooperatively with the cap 13. As a result, use of a complicatedly configured mold or a complicated molding step is avoided when the case body 30 is molded. Also, the shape of the case body 30 may be selected with increased flexibility.

The portion of the case body 30 to which the support plate 31 is attached, which is the peripheral wall 32, is arranged around the seal ring 24 of the air cleaning element 20 with a clearance between the peripheral wall 32 and the seal ring 24. This arrangement increases the volume of the case body 30 to ensure a sufficiently large clearance between the inner peripheral surface of the case body 30 and the outer peripheral surface of the air cleaning element 20. As a result, the flow velocity of the intake air flowing to the filter member 21 is decreased. Particularly, since an air flow passage having a sufficiently large cross-sectional area is formed between a downstream portion of the filter member 21 in the air flow direction and the case body 30, the flow velocity of the intake air flowing to the downstream portion of the filter member 21 is reduced. This reduces pressure loss in the flow of the intake air flowing into the air cleaning element 20. Also, since the air cleaning element 20 is supported by the support plate 31, the cross-sectional area of the opening of the cap 13 located upstream in the air flow direction is ensured to be substantially equal with the cross-sectional area of the opening (which is, the insertion port 33) of the support plate 31. As a result, the cap 13 also has an air flow passage with a sufficiently large cross-sectional area and reduces pressure loss in the flow of the air flowing from the air cleaning element 20. The pressure loss in the intake air passing through the air cleaner 10 is thus reduced. Such pressure loss reduction contributes to improvement of the combustion efficiency of the engine.

In the air cleaner described in Japanese Laid-Open Patent Publication No. 2012-112311, the air filter (the air cleaning element) is supported only by the end surface of the cap. This makes it impossible to form an air flow passage with a large cross-sectional area in the cap. As a result, a great pressure loss occurs.

The support plate 31 is attached to the case body 30 by press-fitting the projections 34 of the case body 30 into the holes 35, which are formed in the outer peripheral portion of the support plate 31. This configuration reduces the number of the components configuring the air cleaner 10 and facilitates attachment of the support plate 31 to the case body 30, compared with the configuration in which the support plate 31 is attached to the case body 30 using a fixing member such as a screw. Also, when press-fitted in the holes 35, the projections 34 stop the support plate 31 from separating from the case body 30 when the cap 13 is detached from the case body 30. This facilitates assembly of the air cleaner 10 and replacement of the air cleaning element 20.

Sealing methods using the seal ring 24 include an inner periphery sealing method and an outer periphery sealing method. In the inner periphery sealing method, the inner peripheral surface of the seal ring 24 is pressed against the outer peripheral surface of a tubular portion provided in the cap. In the outer periphery sealing method, the outer peripheral surface of the seal ring 24 is pressed against the inner peripheral surface of a tubular portion provided in the case body or the cap. However, the seal ring 24 has a substantially oblong outline. Accordingly, if the inner periphery sealing method or the outer periphery sealing method is employed, the seal ring 24 compresses by varied amounts in a circumferential direction of the seal ring 24, thus varying the sealing performance in the circumferential direction of the seal ring 24. Therefore, it is preferable to clamp the seal ring 24 as in the method employed in the present embodiment. This method restricts variation in the sealing performance of the seal ring 24 in the circumferential direction. As a result, such sealing performance variation is limited and flexibility for selecting the shape of the housing 11 is increased.

Further, the cap 13 has the holding portion 43 for holding the seal ring 24 between the cap 13 and the support plate 31. As a result, as in the case of the case 12, the air cleaner 10 is configured by a small number of components compared with a configuration in which the cap 13 includes a cap body and a support plate.

The retainer portion 40, which limits vibration in the air cleaning element 20, is formed integrally with the case body 30. The vibration of the air cleaning element 20 is thus decreased even though the air cleaning element 20 is supported in a cantilever manner by the downstream portion of the case 12 in the air flow direction. As a result, hampering of the sealing performance of the seal ring 24 by such vibration is avoided.

As has been described, the air cleaner 10 of the present embodiment has the advantages described below.

(1) In the air cleaner 10 of the present embodiment, the case 12 is configured by the case body 30 and the support plate 31, which is independent from the case body 30. This configuration increases flexibility for selecting the shape of the housing 11 without decreasing formability of the case body 30.

(2) The seal ring 24 of the air cleaning element 20 is held between the support plate 31 and the holding portion 43 of the cap 13 along the entire circumference of the seal ring 24. This ensures appropriate sealing effect regardless of the shape of the case body 30 or the shape of the cap 13, compared with cases of the inner periphery sealing method or the outer periphery sealing method. As a result, the shape of the case body 30 and the shape of the cap 13 are selected with more increased flexibility.

(3) The peripheral wall 32 of the case body 30 is arranged around the seal ring 24 with a clearance between the peripheral wall 32 and the seal ring 24. An air flow passage with a large cross-sectional area is thus ensured in the case body 30. This reduces pressure loss in the flow of the intake air flowing into the air cleaning element 20 and in the flow of the intake air flowing through the air cleaner 10. Also, since the air cleaning element 20 is supported by the support plate 31, the shape of the cap 13 is selected without much restriction and an air flow passage with a large cross-sectional area is thus ensured also in the cap 13. This also contributes to the pressure loss reduction in the air cleaner 10, thus improving the combustion efficiency of the engine.

(4) The support plate 31 is attached to the case body 30 by press-fitting the projections 34 of the case body 30 into the holes 35 of the support plate 31. This decreases the number of the components configuring the air cleaner 10.

(5) The seal ring 24, which has the oblong outline, is held between the support plate 31 and the holding portion 43 of the cap 13. This prevents variation in the sealing performance and increases flexibility for selecting the shape of the housing 11.

(6) The holding portion 43 for holding the seal ring 24 is formed integrally with the cap 13. This decreases the number of the components of the air cleaner 10.

The present embodiment may be modified to the forms described below.

The cap 13 may be configured by a cap body and a support plate attached to the cap body. In other words, the seal ring 24 of the air cleaning element 20 may be held between the support plate 31, which is attached to the case body 30, and another support plate attached to the cap body.

The outlines of the case body 30, the cap 13, and the seal ring 24 of the air cleaning element 20 are not restricted to the substantially oblong shapes. That is, the case body 30, the cap 13, or the seal ring 24 may have, for example, a circular outline or a rectangular outline.

The support plate 31 may be attached to the case body 30 by either press-fitting projections formed in the support plate 31 into corresponding holes formed in the case body 30 or using a fixing member such as a screw. Alternatively, the support plate 31 may be attached to the case body 30 by swaging the projections 34 of the case body 30 inserted in the corresponding holes 35 of the support plate 31.

The retainer portion 40 of the case body 30 may be omitted. In other words, the air cleaning element 20 may be supported by the housing 11 only by holding the seal ring 24 between the support plate 31 and the cap 13.

The sealing portion 29 of the seal ring 24 may be configured without the stepped surface portion 26.

The support plate 31 may include a protrusion extending along the outer periphery of the sealing surface 36 in the zone corresponding to the entire circumference of the sealing surface 36.

The invention claimed is:

1. An air cleaner comprising:
a housing having a tubular case and a cap, wherein the tubular case includes an end having an upstream opening and another end having a downstream opening, wherein the upstream opening of the case is adapted to introduce air into the housing, and the cap is attached to the downstream opening of the tubular case; and
a tubular air cleaning element having a filter element and an annular sealing portion, wherein the filter element is disposed entirely within the tubular case and the annular sealing portion is held between the tubular case and the cap and is provided on an outer periphery of the tubular air cleaning element, the annular sealing portion including a stepped surface portion extending toward the upstream side of the tubular case and a projected surface portion provided on an outer periphery of the annular sealing portion and projecting toward the downstream side of the tubular case, wherein
the tubular case includes a case body having a downstream opening and a support plate that is provided at an upstream side of the annular sealing portion and attached to the downstream opening of the case body so as to surround an outer periphery of the annular sealing portion,
the tubular air cleaning element is disposed within the tubular case and extends upstream of the support plate, and
the annular sealing portion is held between the support plate and the cap.

2. The air cleaner according to claim 1, wherein a peripheral wall defining the downstream opening of the case body is arranged around the annular sealing portion of the tubular air cleaning element with a clearance between the peripheral wall and the annular sealing portion.

3. The air cleaner according to claim 1, wherein
a projection is formed in the case body, and a hole into which the projection is press-fitted is formed in the support plate.

4. The air cleaner according to claim 1, wherein the annular sealing portion has an oblong outline.

5. The air cleaner according to claim 1, wherein a holding portion for holding the annular sealing portion between the cap and the support plate is formed integrally with the cap.

* * * * *